(12) United States Patent
Yamamoto et al.

(10) Patent No.: US 11,378,960 B2
(45) Date of Patent: Jul. 5, 2022

(54) MOBILE ENTITY

(71) Applicant: HITACHI, LTD., Tokyo (JP)

(72) Inventors: Akihiro Yamamoto, Tokyo (JP); Ryosuke Nakamura, Tokyo (JP); Azusa Amino, Tokyo (JP); Taishi Ueda, Tokyo (JP)

(73) Assignee: Hitachi, Ltd., Tokyo (JP)

(*) Notice: Subject to any disclaimer, the term of this patent is extended or adjusted under 35 U.S.C. 154(b) by 24 days.

(21) Appl. No.: 16/767,196

(22) PCT Filed: Oct. 26, 2018

(86) PCT No.: PCT/JP2018/039810
§ 371 (c)(1),
(2) Date: May 27, 2020

(87) PCT Pub. No.: WO2019/138650
PCT Pub. Date: Jul. 18, 2019

(65) Prior Publication Data
US 2020/0393836 A1 Dec. 17, 2020

(30) Foreign Application Priority Data
Jan. 10, 2018 (JP) .............................. JP2018-002251

(51) Int. Cl.
*G05D 1/02* (2020.01)
*G05D 1/08* (2006.01)
*B62D 57/02* (2006.01)

(52) U.S. Cl.
CPC ......... *G05D 1/0212* (2013.01); *G05D 1/0891* (2013.01); *B62D 57/02* (2013.01); *G05D 2201/0217* (2013.01)

(58) Field of Classification Search
CPC .............. G05D 1/0212; G05D 1/0891; G05D 2201/0217; B62D 57/02
(Continued)

(56) References Cited

U.S. PATENT DOCUMENTS

| 9,618,937 B1* | 4/2017 | Blankespoor | ........ B62D 57/032 |
| 2003/0036818 A1* | 2/2003 | Hattori | ................. B62D 57/032 |
| | | | 700/245 |
| 2005/0067993 A1* | 3/2005 | Kato | ...................... B62D 57/02 |
| | | | 318/568.12 |

(Continued)

FOREIGN PATENT DOCUMENTS

| JP | 08-022324 A | 1/1996 |
| JP | 2001-150370 A | 6/2001 |

(Continued)

OTHER PUBLICATIONS

International Search Report of PCT/JP2018/039810 dated Nov. 27, 2018.

(Continued)

*Primary Examiner* — Yazan A Soofi
(74) *Attorney, Agent, or Firm* — Mattingly & Malur, PC

(57) ABSTRACT

A mobile entity includes: a position decision unit configured to determine a position of itself; an environment information acquisition unit configured to acquire environment information at the position; and a motion determination unit configured to determine whether a motion scheduled to be performed holds based on the environment information. The environment information includes at least one of environment information related to a vocal apparatus and environment information related to a display device.

6 Claims, 12 Drawing Sheets

(58) Field of Classification Search
USPC .......................................................... 701/26
See application file for complete search history.

(56) References Cited

U.S. PATENT DOCUMENTS

| | | | | |
|---|---|---|---|---|
| 2006/0059975 | A1* | 3/2006 | Kawaguchi | G01L 25/00 73/1.15 |
| 2006/0243499 | A1* | 11/2006 | Hosoda | B62D 57/028 180/8.5 |
| 2011/0231050 | A1* | 9/2011 | Goulding | B62D 57/032 701/26 |
| 2017/0357272 | A1* | 12/2017 | Tsuji | G01P 3/00 |

FOREIGN PATENT DOCUMENTS

| | | |
|---|---|---|
| JP | 2003-334773 A | 11/2003 |
| JP | 2005-313291 A | 11/2005 |
| JP | 2007-160427 A | 6/2007 |
| JP | 2008-254122 A | 10/2008 |
| JP | 2009-118720 A | 5/2009 |

OTHER PUBLICATIONS

Japanese Office Action received in corresponding Japanese Application No. 2018-002251 dated Nov. 2, 2021.

* cited by examiner

MOBILE ENTITY

CROSS REFERENCE TO RELATED APPLICATIONS

This application is a National Stage Application, under 35 U.S.C. § 371, of PCT/JP2018/039810, filed on Oct. 26, 2018, and claiming priority to JP2018-002251, filed Jan. 10, 2018, the disclosures of which are incorporated herein in their entireties by reference.

TECHNICAL FIELD

The present invention relates to a mobile entity.

BACKGROUND ART

An autonomously movable mobile entity (such as a robot) is controlled by various means. For example, PTL 1 discloses a legged locomotion robot capable of rising autonomously reliably and smoothly from various fallen attitudes by including means for determining whether the robot has fallen, means for determining the attitude at the time of falling, and means for executing a rising motion pattern according to the fallen attitude.

CITATION LIST

Patent Literature

PTL 1: JP 2001-150370 A

SUMMARY OF INVENTION

Technical Problem

However, the mobile entity of PTL 1 cannot determine in advance whether a motion scheduled to be performed (such as returning from a fallen state) holds in consideration of the surrounding environment. Therefore, depending on the surrounding environment at the time of falling, there has been a problem that the mobile entity cannot properly return from a fallen state, for example.

The present invention has been made to solve the above-described problem, and has as its object to provide a mobile entity or the like that can perform a smooth motion in consideration of the surrounding environment.

Solution to Problem

In order to solve the above-described problem, the present invention includes: a position decision unit configured to determine a position of itself; an environment information acquisition unit configured to acquire environment information at the position; and a motion determination unit configured to determine whether a motion scheduled to be performed holds based on the environment information.

Advantageous Effects of Invention

According to the present invention, it is possible to provide a mobile entity or the like that can perform a smooth motion in consideration of the surrounding environment.

DESCRIPTION OF EMBODIMENTS

Hereinafter, a mobile entity, a motion control system, and a mobile entity system according to the present embodiment will be described. It should be noted that since the drawings referred to in the following description schematically show the embodiments, the scale, spacing, positional relationship, and the like of each member may be exaggerated, or illustration of some of the members may be omitted. In addition, in the following description, the same names and

First Embodiment

Figure 1:
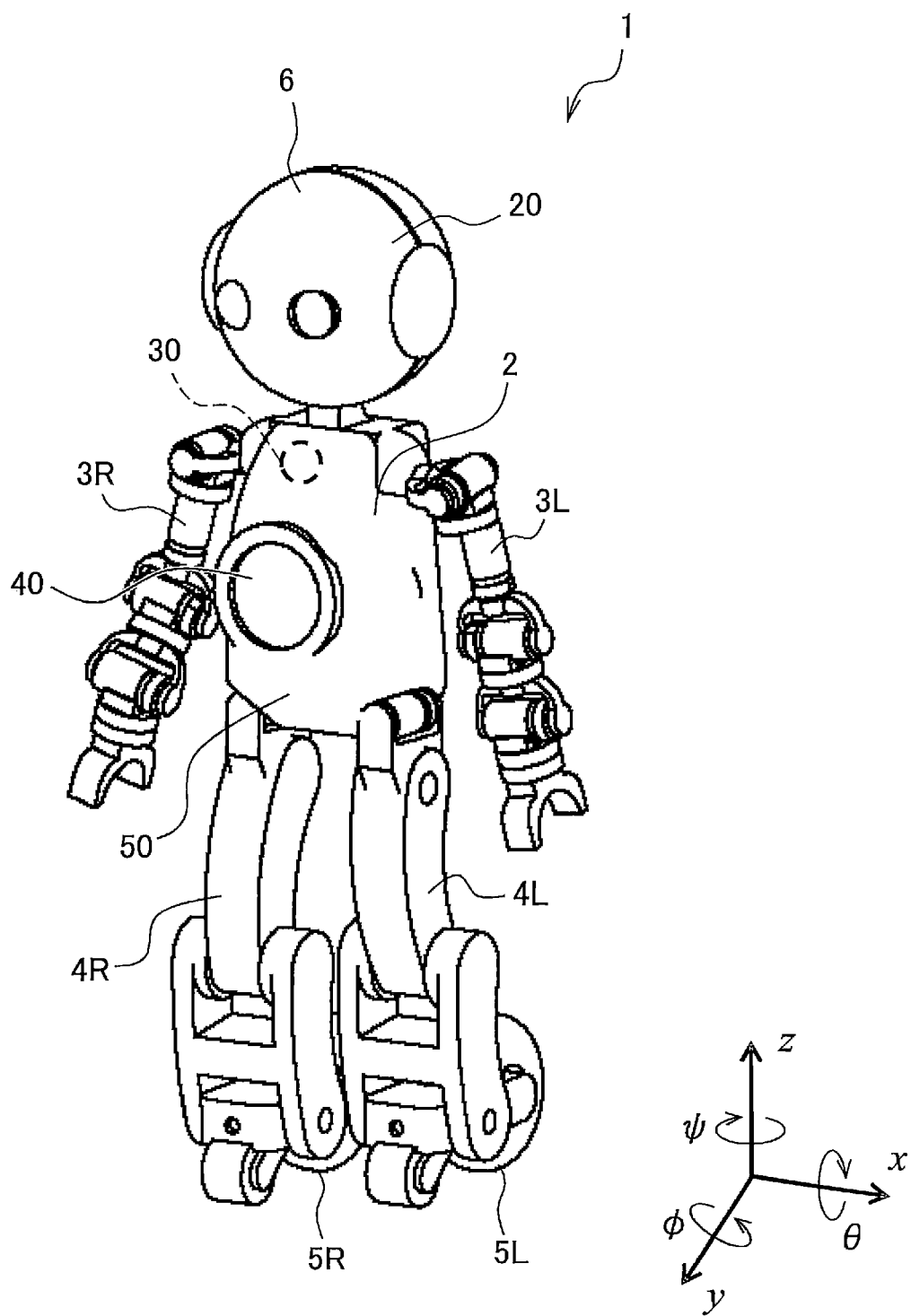
FIG. 1 is a diagram illustrating an example of a configuration of a mobile entity according to the present embodiment.
Figure 2:
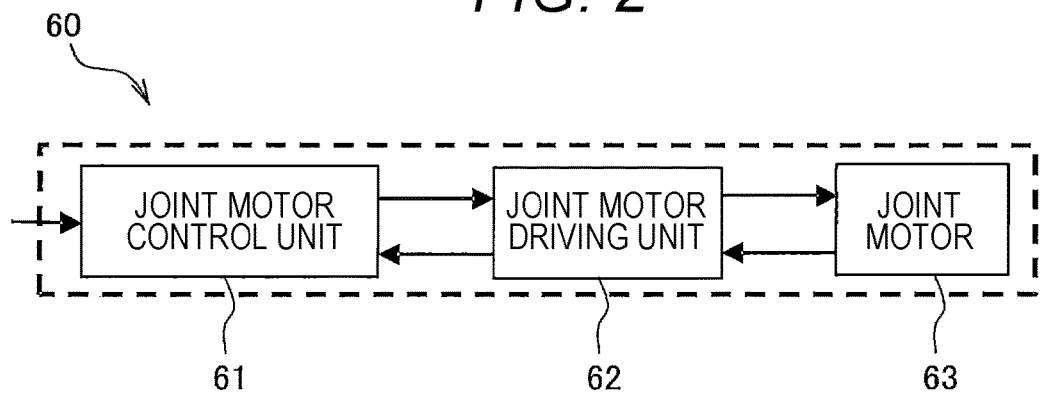
FIG. 2 is a diagram illustrating an example of a configuration of an attitude driving device according to the present embodiment.
Figure 3:
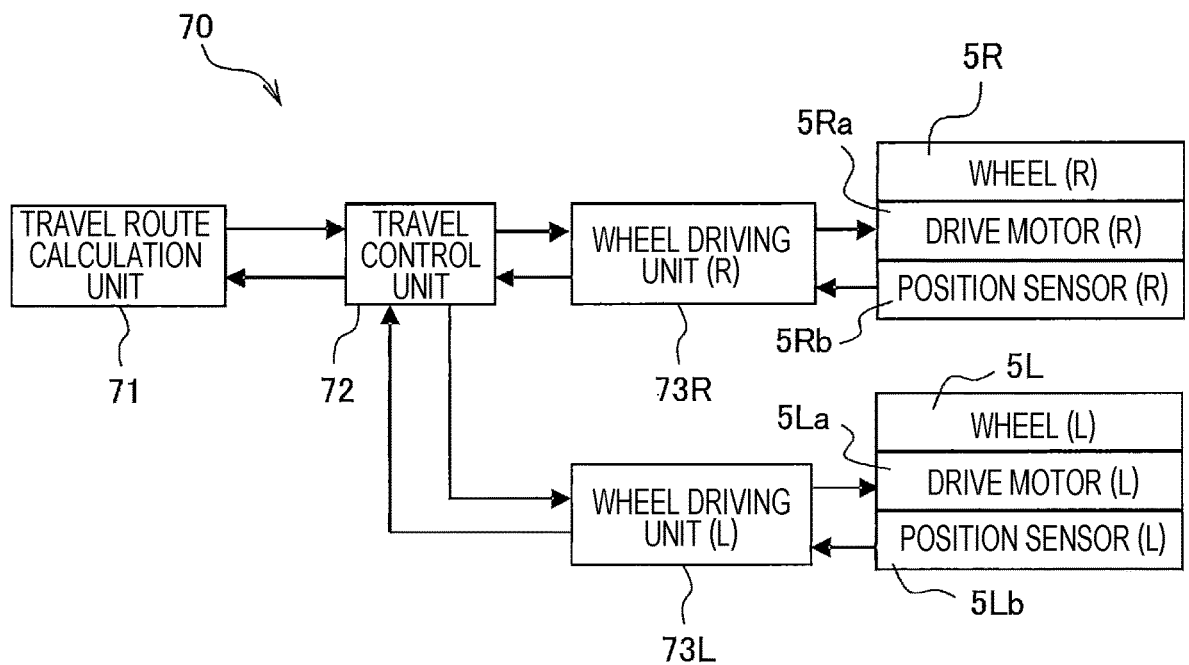
FIG. 3 is a diagram illustrating an example of a configuration of a wheel driving device according to the present embodiment.

First, a mobile entity 1 according to the present embodiment will be described with reference to FIGS. 1 to 3. FIG. 1 is a diagram illustrating an example of a configuration of the mobile entity according to the present embodiment. FIG. 2 is a diagram illustrating an example of a configuration of an attitude driving device according to the present embodiment. FIG. 3 is a diagram illustrating an example of a configuration of a wheel driving device according to the present embodiment.

The mobile entity 1 includes a body 2, an arm 3R, an arm 3L, a leg 4R, a leg 4L, a wheel 5R, a wheel 5L, and a head 6. Each joint of the body 2, arm 3R, arm 3L, leg 4R, leg 4L, and head 6 is provided with a joint motor 63, and moving each joint freely allows the mobile entity 1 to perform a motion such as tilting the body 2 forward, swinging the arm 3R or 3L, extending the leg 4R or 4L, or shaking the head, for example.

The head 6 includes a vocal apparatus 20, and the body 2 includes a display device 30. The vocal apparatus 20 speaks or utters based on a motion command input from a motion planning unit 17 (see FIG. 4) described below. The vocal apparatus 20 includes a speaker or a buzzer, for example. The display device 30 displays necessary information, various images, and the like based on a motion command input from a motion planning unit 17 (see FIG. 4) described below. The display device 30 includes a touch panel display, a liquid crystal display, and a head-up display, for example. Speaking or uttering by the vocal apparatus 20 and displaying necessary information, various images, and the like by the display device 30 allows the mobile entity 1 to communicate with humans.

The body 2 includes an appearance measuring device 40. The appearance measuring device 40 measures a distance to an object (such as an obstacle or a wall) present around the mobile entity 1, and outputs the measurement result to the appearance measuring unit 11 and the motion determination unit 15 (see FIG. 4) described below. The appearance measuring device 40 includes an infrared distance sensor and a laser range scanner, for example.

In addition, the body 2 includes an attitude angle detecting device 50. The attitude angle detecting device 50 detects the attitude angle of the moving body 1 and the attitude angular velocity of the mobile entity 1, and outputs the detection result to a motion determination unit (see FIG. 4) described below. The attitude angle detecting device 50 includes an acceleration sensor and a gyro sensor, for example.

For example, the attitude angle detecting device 50 detects an attitude angle $\theta$ related to a pitch direction being a rotation direction around the x-axis, an attitude angle $\varphi$ related to a roll direction being a rotation direction around the y-axis, and an attitude angle $\psi$ related to a yaw direction being a rotation direction around the z-axis.

The attitude angle at which the mobile entity 1 can stand up independently is set in advance. Therefore, for example, when the attitude angle $\theta$ related to the pitch direction detected by the attitude angle detecting device satisfies $\theta min \leq \theta \leq \theta max$, and the attitude angle $\varphi$ related to the roll direction detected by the attitude angle detecting device 50 satisfies $\varphi min \leq \varphi \leq \varphi max$, the motion determination unit 15 (see FIG. 4) described below can determine that the mobile entity 1 can stand up independently. In addition, for example, when the attitude angle $\theta$ related to the pitch direction detected by the attitude angle detecting device 50 satisfies $\theta < \theta min$, and the attitude angle $\varphi$ related to the roll direction detected by the attitude angle detecting device 50 satisfies $\varphi max < \varphi$, the motion determination unit 15 (see FIG. 4) described below can determine that the mobile entity 1 cannot stand up independently.

The administrator or the operator of the mobile entity 1 optionally sets, changes, or updates the value or configuration of an environment information group 34 (see FIG. 5) described below using the environment information setting device 80.

For example, the environment information setting device 80 performs various settings such as a setting of the utterance availability of the vocal apparatus 20 at a predetermined position where the mobile entity 1 is present and a setting of an allowable sound volume. In addition, the environment information setting device 80 performs various settings such as a setting of display availability of the display device 30 at a predetermined position where the mobile entity 1 is present and a setting of brightness. In addition, the environment information setting device 80 performs various settings of an inclination angle of a floor surface at a predetermined position where the mobile entity 1 is present, a distance to an obstacle 32 or a wall 33 near the position, and the like.

The environment information setting device 80 includes a laptop computer, a personal computer, a tablet, and a smartphone, in which a wireless LAN is incorporated, for example. The environment information setting device 80 has a function of receiving an input operation by an administrator or an operator of the mobile entity 1, and the function includes a keyboard, a camera, a mouse, a touch panel, a voice-input receiving microphone, a gesture recognizing camera, a selection button, a lever, and other sensors, for example. The input from the environment information setting device 80 to the arithmetic processing device 10 is preferably performed wirelessly.

The mobile entity 1 includes an attitude driving device 60 as shown in FIG. 2. The attitude driving device 60 includes a joint motor control unit 61, a joint motor driving unit 62, a joint motor 63, and the like.

The joint motor control unit 61 calculates control signals for controlling the body 2, the arm 3R, the arm 3L, the leg 4R, the leg 4L, and the head 6 based on a motion command input from a motion planning unit 17 (see FIG. 4) described below, and outputs the control signals to the joint motor driving unit 62.

The joint motor drive unit 62 calculates the driving signals (voltages corresponding to the control signals) based on the control signal input from the joint motor control unit 61, and outputs (applies) the driving signals to the joint motor 63.

The joint motor 63 controls the attitude of the mobile entity 1 by moving the body 2, the arm 3R, the arm 3L, the leg 4R, the leg 4L, and the head 6 based on the voltage input from the joint motor driving unit 62. For example, the joint motor 63 adjusts the position of the hand by changing the joint angle of the arm 3R or 3L, and adjusts the standing attitude and sitting attitude of the mobile entity 1 by changing the joint angle of the leg 4R or 4L.

In addition, as shown in FIG. 3, the mobile entity 1 includes a wheel driving device 70. The wheel drive device 70 includes a travel route calculation unit 71, a travel control unit 72, a wheel driving unit 73R, a wheel driving unit 73L, a drive motor 5Ra, a drive motor 5La, a position sensor 5Rb, a position sensor 5Lb, and the like.

The travel route calculation unit 71 calculates a travel command (such as a travel speed command and a travel direction command) and outputs the travel command to the travel control unit 72. It should be noted that the travel here is also the walking of the mobile entity 1.

The travel control unit 72 calculates a control signal for controlling the wheel 5R or 5L based on the travel command input from the travel route calculation unit 71, and outputs the control signal to the wheel driving unit 73R or 73L.

The wheel driving unit 73R or 73L calculates a driving signal (a voltage corresponding to the control signal) based on the control signal input from the travel control unit 72, and outputs (applies) the driving signal to the drive motor 5Ra or 5La. The wheel driving units 73R and 73L are symmetrically arranged side by side in a direction parallel to the central axis of the wheel.

The drive motor 5Ra is connected to the wheel 5R, and the rotation of the drive motor 5Ra causes the wheel 5R to rotate. The drive motor 5La is connected to the wheel 5L, and the rotation of the drive motor 5La causes the wheel 5L to rotate.

The position sensor 5Rb detects the rotation angle of the wheel 5R, the position sensor 5Lb detects the rotation angle of the wheel 5L, and the detection results are output to the odometry calculation unit 12 (see FIG. 4) described below. It should be noted that the wheel 5R or 5L may be provided with a rotational speed detection device that detects the rotational speed of the wheel 5R or the rotational speed of the wheel 5L.

«Configuration of Motion Control System»

Figure 4:
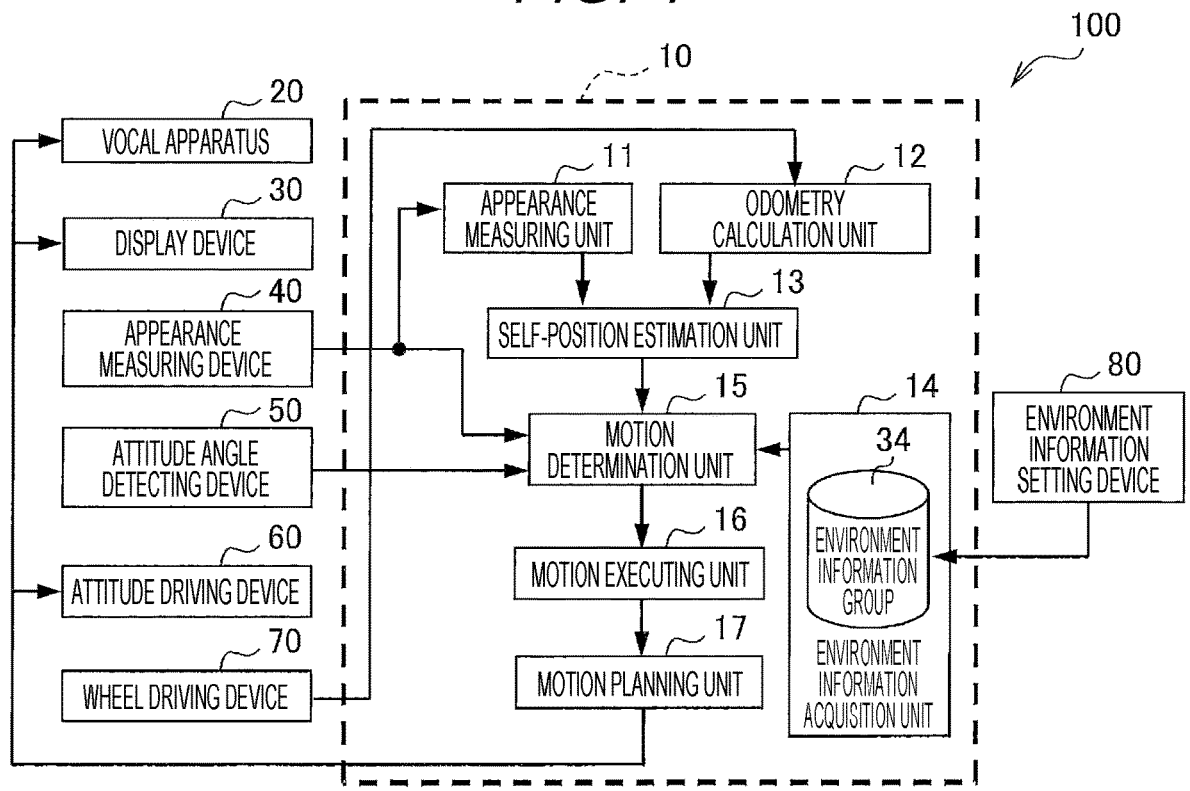
FIG. 4 is a diagram illustrating an example of a configuration of a motion control system according to the present embodiment.
Figure 5:
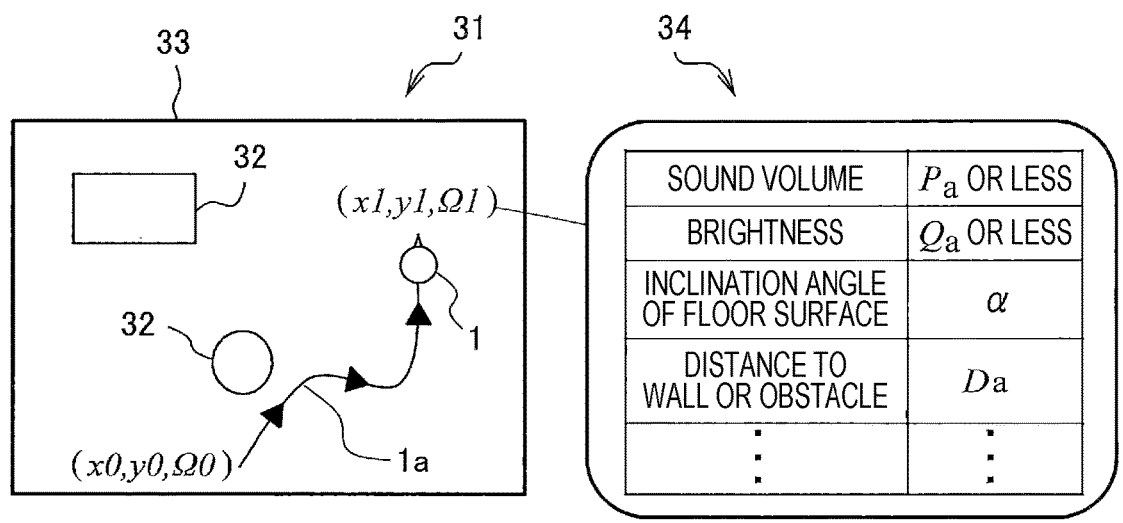
FIG. 5 is a diagram illustrating an example of map information and an environment information group according to the present embodiment.

Next, a motion control system 100 that controls the mobile entity 1 described above will be described with reference to FIGS. 4 and 5. FIG. 4 is a functional block diagram illustrating an example of a configuration of the motion control system 100 according to the present embodiment. FIG. 5 shows map information and an environment information group according to the present embodiment.

The motion control system 100 includes an arithmetic processing device 10, a vocal apparatus 20, a display device 30, an appearance measuring device 40, an attitude angle detecting device 50, an attitude driving device 60, a wheel driving device 70, an environment information setting device 80, and the like. Furthermore, the arithmetic processing device 10 includes an appearance measuring unit 11, an odometry calculation unit 12, a self-position estimation unit 13 (position decision unit), an environment information acquisition unit 14, a motion determination unit 15, a motion executing unit (motion command unit) 16, a motion planning unit 17, a memory, and the like.

The arithmetic processing device 10 is, for example, a central processing unit (CPU), reads a control program stored in a memory, expands the control program in a work area, and executes the control program, thereby controlling each component. It should be noted that the arithmetic processing device 10 may be provided inside the mobile entity 1 or may be provided outside the mobile entity 1.

The memory is used as a work storage area for the arithmetic processing device 10 to execute the control program. The memory includes, for example, a read only memory (ROM) and a random access memory (RAM), and stores the map information 31, the environment information group 34, the control program executed by the arithmetic processing device 10, various pieces of data necessary for executing the control program, and the like. It should be noted that the memory does not necessarily have to be provided inside the arithmetic processing device 10, and may be an external storage device.

Specifically, as shown in FIG. 5, the memory stores in advance map information 31 on a range in which the mobile entity 1 moves. In addition, the memory stores an environment information group 34 corresponding to the position of the mobile entity 1 indicated in the map information 31. The map information 31 includes the position of the obstacle 32, the position of the wall 33, and the like. The environment information group 34 includes environment information such as "sound volume", "brightness", "inclination angle of floor surface", "distance to obstacle 32 or wall 33", and the like.

The configuration and values of the environment information group 34 are appropriately set, changed, or updated by the environment information setting device 80. For example, the values of the environment information group 34 is set by the environment information setting device 80, as in, "sound volume" is Pa or less, "brightness" is Qa or less, "inclination angle of floor surface" is α, "distance to obstacle 32 or wall 33" is Da, and the like.

The appearance measuring unit 11 converts the measured value input from the appearance measuring device 40 into distance data, and outputs the converted distance data to the self-position estimation unit 13.

The odometry calculation unit 12 calculates the movement information of the mobile entity 1 based on the rotation angles, the rotational speeds, the rotation amounts, and the like of the two wheels (wheels 5R and 5L) input from the wheel driving device 70.

For example, as shown in FIG. 5, the coordinates used for the self-position estimation in the present embodiment are assumed to be p(xp, yp, Ωp). In FIG. 5, x is a right-hand direction with respect to the traveling direction of the mobile entity 1. In addition, y is the traveling direction of the mobile entity 1. In addition, Ω is the rotation amount counterclockwise with respect to the y-axis. When the mobile entity 1 moves along the path 1a from the position (x0, y0, Ω0) to the position (x1, y1, Ω1), the odometry calculation unit 12 calculates the coordinates p(xp, yp, Ωp) of the mobile entity 1 based on the rotation angle of the wheel, thereby calculating the movement amount from the position (x0, y0, Ω0) to the position (x1, y1, Ω1) as movement information. It should be noted that as the coordinate axes used for self-position estimation, any coordinate axes can be used.

Based on the distance data input from the appearance measuring unit 11, the movement information input from the odometry calculation unit 12, the map information 31 stored in the memory, and the like, the self-position estimation unit 13 estimates (estimates and decides) the position of the self (mobile entity 1). For example, as shown in FIG. 5, when the mobile entity 1 moves along the path 1a, the self-position estimation unit 13 estimates (decides) that the self-position after the movement is the position (x1, y1, Ω1).

The self-position estimation unit 13 can estimate (decide) the self-position using, for example, a light detection and ranging (LiDAR), a camera, a sensor such as an infrared sensor, an ultrasonic sensor, or a laser scanner, or the like.

The environment information acquisition unit 14 acquires the environment information at the position estimated (decided) by the self-position estimation unit 13 with reference to the environment information group 34 stored in the memory, the setting values set by the environment information setting device 80, and the like.

The motion determination unit 15 determines in advance whether the motion scheduled to be performed holds based on the environment information input from the environment information acquisition unit 14. Then, the motion determination unit 15 outputs the determination result to the motion executing unit 16.

The motion scheduled to be performed is preferably a predetermined motion, and examples thereof include returning from a fallen state, speaking, utterance, expression, motion (such as waving an arm or shaking the head), lighting of a light (such as an LED), and display of an image.

When determining that the motion scheduled to be performed holds, the motion determination unit 15 sets the motion execution to ON and outputs to the motion executing unit 16 the determination result that the motion scheduled to be performed holds.

On the other hand, when determining that the motion scheduled to be performed does not hold, the motion determination unit 15 further determines whether the motion information can be corrected.

The motion information is information related to a motion scheduled to be performed, and those corresponding to the environment information related to the vocal apparatus 20 include, for example, the utterance sound volume P of the mobile entity 1, the allowable sound volume Pa for the surrounding environment of the mobile entity 1, and the minimum value Pmin and the maximum value Pmax of the utterance sound volume that can be uttered by the mobile entity 1. Alternatively, those corresponding to the environment information related to the display device 30 include, for example, the brightness Q of the light of the mobile entity 1, the brightness Qa allowed for the surrounding environment of the mobile entity 1, and the minimum value Qmin and the maximum value Qmax of the brightness of the light that can be turned on of the mobile entity 1.

When determining that the motion information can be corrected, the motion determination unit 15 corrects the motion information to set the motion execution to ON, and outputs the determination result that the motion scheduled to be performed holds to the motion executing unit 16. When determining that the motion information cannot be corrected, the motion determination unit 15 reports an error to the administrator or the operator of the mobile entity 1 without correcting the motion information, sets the motion execution to OFF, and outputs the determination result that the motion scheduled to be performed does not hold to the motion executing unit 16.

Alternatively, when determining that the motion scheduled to be performed does not hold, the motion determination unit 15 further determines whether to restrict the motion scheduled to be performed.

When determining that the motion scheduled to be performed is restricted, the motion determination unit 15 restricts the motion scheduled to be performed to set the motion execution to ON, and outputs the determination result that the motion scheduled to be performed holds to the motion executing unit 16. When determining that the motion scheduled to be performed is not restricted, the motion determination unit 15 sets the motion execution to ON without restricting the motion scheduled to be performed, and outputs the determination result that the motion scheduled to be performed holds to the motion executing unit 16.

The motion executing unit 16 outputs various commands related to the motion to the motion planning unit 17 based on the determination result input from the motion determination unit 15. The motion executing unit 16 outputs a command for executing the motion to the motion planning unit 17 based on, for example, the determination result that the motion scheduled to be performed holds. The motion executing unit 16 outputs a command for not executing the motion to the motion planning unit 17 based on, for example, the determination result that the motion scheduled to be performed does not hold.

Based on various commands input from the motion executing unit 16, the motion planning unit 17 calculates a motion command (such as speaking or utterance) to the vocal apparatus 20, a motion command (such as lighting of the light) to the display device 30, and a motion command (such as returning from a fallen state) of the attitude driving device 60, and outputs each motion command to a corresponding device.

According to the mobile entity according to the present embodiment, it is possible to determine in advance whether the motion scheduled to be performed holds in consideration of the surrounding environment, so that for example, even if the mobile entity 1 falls down, the mobile entity 1 can properly return from a fallen state. In addition, for example, when the mobile entity 1 is present in a quiet environment or present in a movie theater or the like, it is possible to cause the mobile entity 1 not to speak, or cause the mobile entity 1 to adjust the sound volume at the time of speaking. In addition, for example, when the mobile entity 1 is present near the wall, it is possible to cause the mobile entity 1 not to shake the arm, or cause the mobile entity 1 to shake only one arm farther from the wall.

«Example of Processing of Motion Determination Unit»

Figure 6:
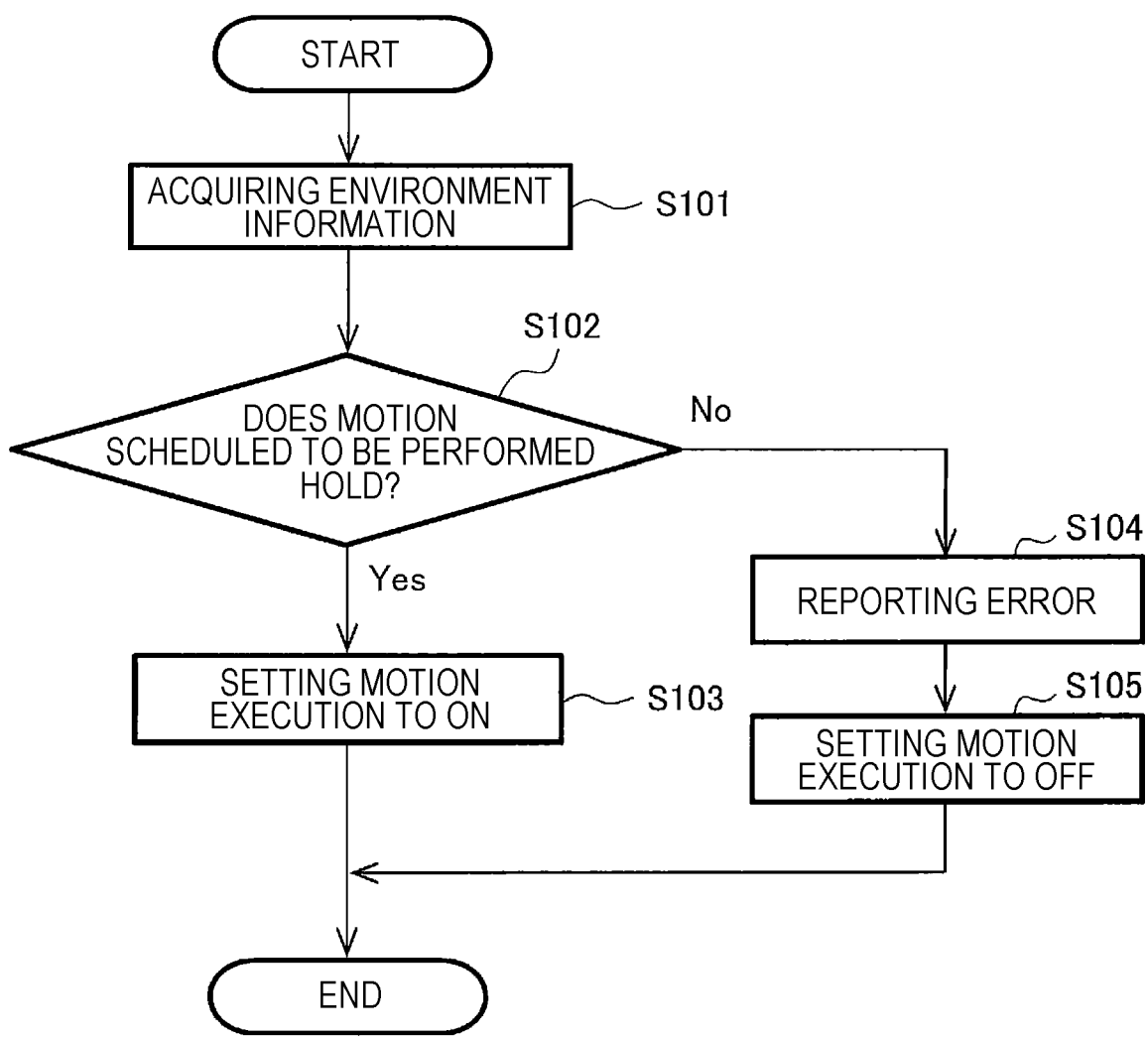
FIG. 6 is a flowchart illustrating an example of processing of a motion determination unit according to a first embodiment.

FIG. 6 is a flowchart illustrating an example of processing of the motion determination unit 15 according to the present embodiment. Here, a case where the motion determination unit 15 performs each process with reference to the environment information related to the vocal apparatus 20 will be described as an example.

In step S101, the motion determination unit 15 acquires, from the environment information acquisition unit 14, environment information at the estimated position of the mobile entity 1.

The motion determination unit 15 acquires "sound volume" being environment information related to the vocal apparatus 20 from within the environment information included in the environment information group 34.

In step S102, the motion determination unit 15 determines whether a motion scheduled to be performed (such as utterance) holds. If determining that the motion scheduled to be performed holds, the motion determination unit 15 proceeds to the process in step S103. If determining that the motion scheduled to be performed does not hold, the motion determination unit 15 proceeds to the process in step S104.

For example, assume that the utterance sound volume requested by the task is P. At this time, the motion determination unit 15 determines whether the utterance sound volume P requested by the task is the allowable sound volume Pa or less (utterance sound volume P≤allowable sound volume Pa). If the utterance sound volume P requested by the task is the allowable sound volume Pa or less, the motion determination unit 15 proceeds to the process in step S103. On the other hand, if the utterance sound volume P requested by the task is larger than the allowable sound volume Pa, the motion determination unit 15 proceeds to the process in step S104.

In step S103, the motion determination unit 15 sets the motion execution to ON.

In step S104, since the utterance sound volume P requested by the task exceeds the allowable sound volume Pa at the position where the mobile entity 1 is estimated to be present, the motion determination unit 15 sets an error expressing that the motion scheduled to be performed (such as utterance) does not hold. Then, the motion determination unit 15 reports an error to the administrator or the operator of the mobile entity 1.

In step S105, the motion determination unit 15 sets the motion execution to OFF.

According to the above-described processing, it is possible for the mobile entity 1 to determine in advance whether a motion scheduled to be performed holds in an environment where the mobile entity 1 is present.

«Example of Processing of Motion Determination Unit»

Figure 7:
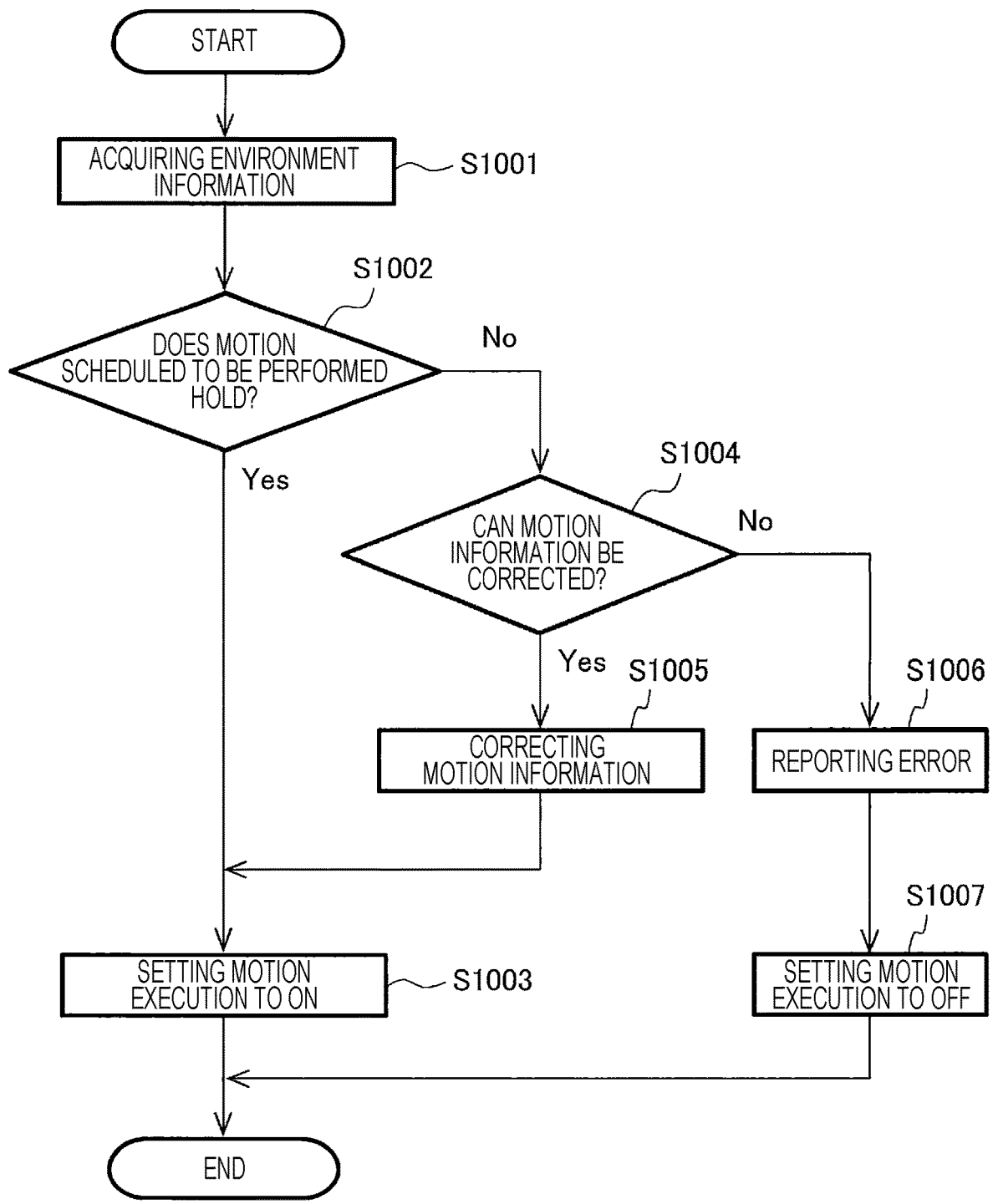
FIG. 7 is a flowchart illustrating an example of processing of a motion determination unit according to the first embodiment.

FIG. 7 is a flowchart illustrating an example of processing of the motion determination unit 15 according to the present embodiment. Here, a case where the motion determination unit 15 performs each process with reference to the environment information related to the vocal apparatus 20 will be described as an example. It should be noted that, in FIG. 7, a duplicate description will be omitted on the part common to that in FIG. 6.

The processes from step S1001 to step S1003 are the same as the processes from step S101 to step S103 in FIG. 6.

In step S1004, the motion determination unit 15 determines whether the motion information can be corrected so that the utterance sound volume P requested by the task satisfies the allowable sound volume Pa.

If determining that the motion information can be corrected, the motion determination unit 15 proceeds to the process in step S1005. If determining that the motion information cannot be corrected, the motion determination unit 15 proceeds to the process in step S1006.

For example, in the vocal apparatus 20, it is assumed that the utterance sound volume that can be uttered P satisfies Pmin≤P≤Pmax. At this time, if the allowable sound volume Pa is not less than the minimum value Pmin of the utterance sound volume that can be uttered P (sound volume Pmin≤allowable sound volume Pa), the motion determination unit 15 determines that the motion information can be corrected and proceeds to the process in S1005. On the other hand, if the allowable sound volume Pa is less than the minimum value Pmin of the utterance sound volume that can be uttered P (sound volume Pmin>allowable sound volume Pa), the motion determination unit 15 determines that the motion information cannot be corrected and proceeds to the process in S1006.

In step S1005, the motion determination unit 15 corrects the motion information. For example, the motion determination unit 15 changes the utterance sound volume P requested by the task to the allowable sound volume Pa (utterance sound volume P=allowable sound volume Pa).

In step S1006, since the utterance sound volume P requested by the task exceeds the allowable sound volume Pa at the estimated position of the mobile entity 1, and further, it is also impossible to correct the motion information, the motion determination unit 15 sets an error expressing that the motion scheduled to be performed (such as utterance) does not hold. Then, the motion determination unit 15 reports an error to the administrator or the operator of the mobile entity 1.

The process in step S1007 is the same as the process in step S105 in FIG. 6.

It should be noted that the same processing as described above can be performed also when the motion determination unit 15 refers to the environment information related to the display device 30. In this case, the motion information is Q, Qa, Qmin, and Qmax instead of P, Pa, Pmin, and Pmax.

According to the above-described processing, it is possible for the mobile entity 1 to determine in advance whether a motion scheduled to be performed holds in an environment where the mobile entity 1 is present.

Second Embodiment

«Example of Processing of Motion Determination Unit»

Figure 8:
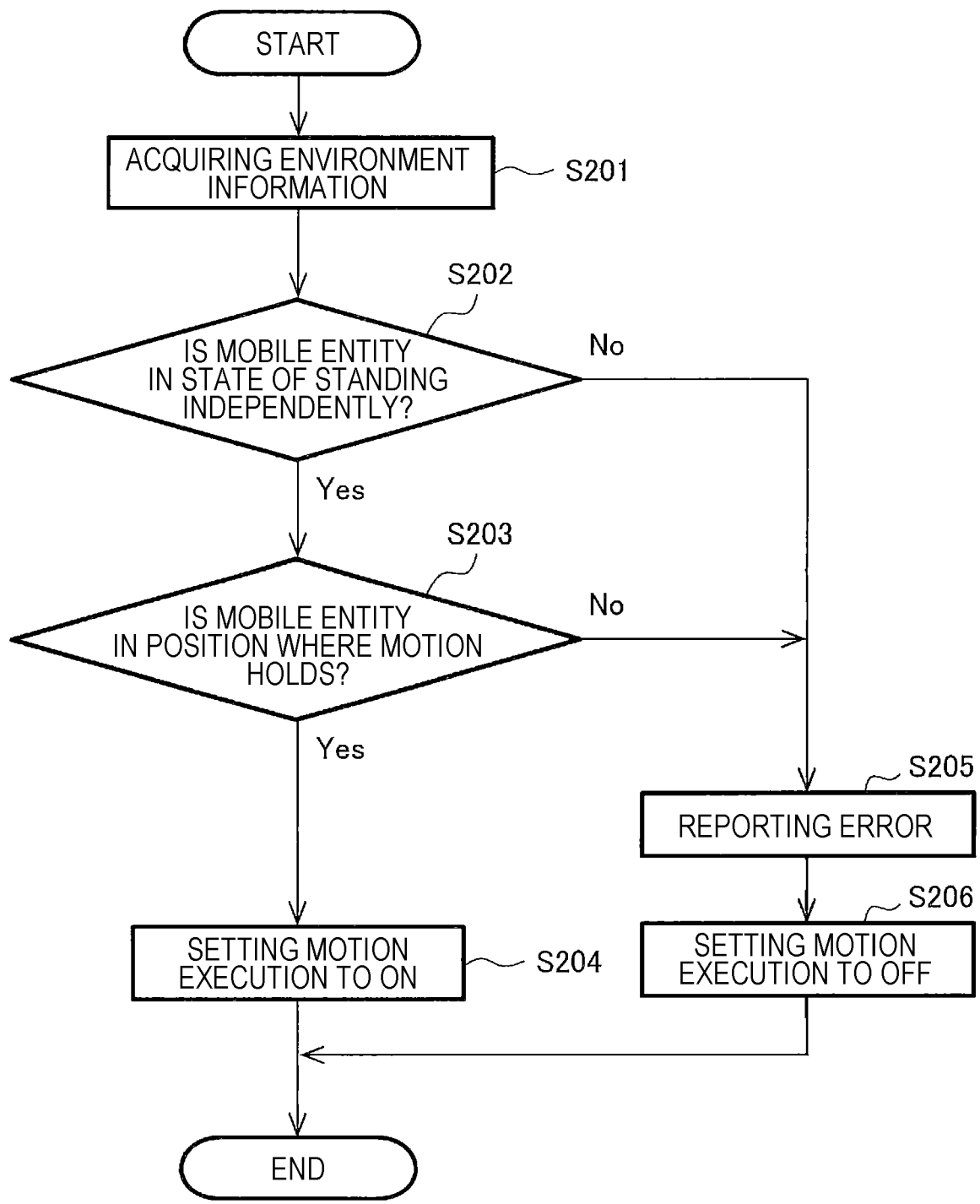
FIG. 8 is a flowchart illustrating an example of processing of a motion determination unit according to a second embodiment.

FIG. 8 is a flowchart illustrating an example of processing of the motion determination unit 15 according to the present embodiment. Here, a case where the motion determination unit 15 performs each process with reference to the environment information related to the attitude angle detecting device 50 will be described as an example.

In step S201, the motion determination unit 15 acquires, from the environment information acquisition unit 14, environment information at the estimated position of the mobile entity 1.

The motion determination unit 15 acquires "the inclination angle of the floor surface" and "the distance to the obstacle 32 or the wall 33" from within the environment information included in the environment information group 34.

In step S202, the motion determination unit 15 determines whether the mobile entity 1 stands independently. It should be noted that the reason why the motion determination unit 15 makes the determination is because performing the motion scheduled to be performed in a state where the mobile entity 1 does not stand independently (a fallen state or a state of leaning on something) would induce a failure of the mobile entity 1.

If determining that the mobile entity 1 is in a state of standing independently, the motion determination unit 15 proceeds to the process in step S203. If determining that the mobile entity 1 is not in a state of standing independently, the motion determination unit 15 proceeds to the process in step S205.

For example, if the attitude angle θ related to the pitch direction satisfies θmin≤θ≤θmax, and the attitude angle φ related to the roll direction satisfies φmin≤φ≤φmax, the motion determination unit 15 determines that the mobile entity 1 is in a state of standing independently and proceeds to the process in step S203. On the other hand, if the attitude angle θ related to the pitch direction does not satisfy θmin≤θ≤θmax, and the attitude angle φ related to the roll direction does not satisfy φmin≤φ≤φmax, the motion determination unit 15 determines that the mobile entity 1 is in a state of not standing independently and proceeds to the process in step S205.

In step S203, the motion determination unit 15 determines whether the position where the mobile entity 1 is present is a position where the motion requested by the task (motion scheduled to be performed) holds. If determining that the position where the mobile entity 1 is present is a position where the motion requested by the task holds, the motion determination unit 15 proceeds to the process in step S204. If determining that the position where the mobile entity 1 is present is a position where the motion requested by the task does not hold, the motion determination unit 15 proceeds to the process in step S205.

For example, it is assumed that the distance to the nearby obstacle 32 or wall 33 is Da. At this time, the motion determination unit 15 determines whether the proximity distance Da is not less than the shortest distance D1 to the obstacle 32 or the wall 33 where the motion scheduled to be performed holds (proximity distance Da≥shortest distance D1).

If the proximity distance Da is not less than the shortest distance D1, the motion determination unit 15 determines that the position where the mobile entity 1 is present is a position where the motion requested by the task holds and proceeds to the process in step S204. On the other hand, if the proximity distance Da is less than the shortest distance D1, the motion determination unit 15 determines that the position where the mobile entity 1 is present is a position where the motion requested by the task does not hold and proceeds to the process in step S205.

In step S204, the motion determination unit 15 sets the motion execution to ON.

In step S205, if a transition is made from step S202, the motion determination unit 15 sets an error expressing that since the mobile entity 1 does not stand independently, the mobile entity 1 will break down when performing the motion scheduled to be performed. Then, the motion determination unit 15 reports an error to the administrator or the operator of the mobile entity 1.

In addition, in step S205, if a transition is made from step S203, the motion determination unit 15 sets an error expressing that since the distance to the nearby obstacle 32 or wall 33 is shorter than the shortest distance to the obstacle 32 or wall 33 where the motion scheduled to be performed holds, the motion scheduled to be performed does not hold. Then, the motion determination unit 15 reports an error to the administrator or the operator of the mobile entity 1.

In step S206, the motion determination unit 15 sets the motion execution to OFF.

According to the above-described processing, it is possible for the mobile entity 1 to determine in advance whether a motion scheduled to be performed holds in an environment where the mobile entity 1 is present. Thus, it is possible to prevent the mobile entity 1 from colliding with a wall or an obstacle or falling over during motion.

«Example of Processing of Motion Determination Unit»

Figure 9:
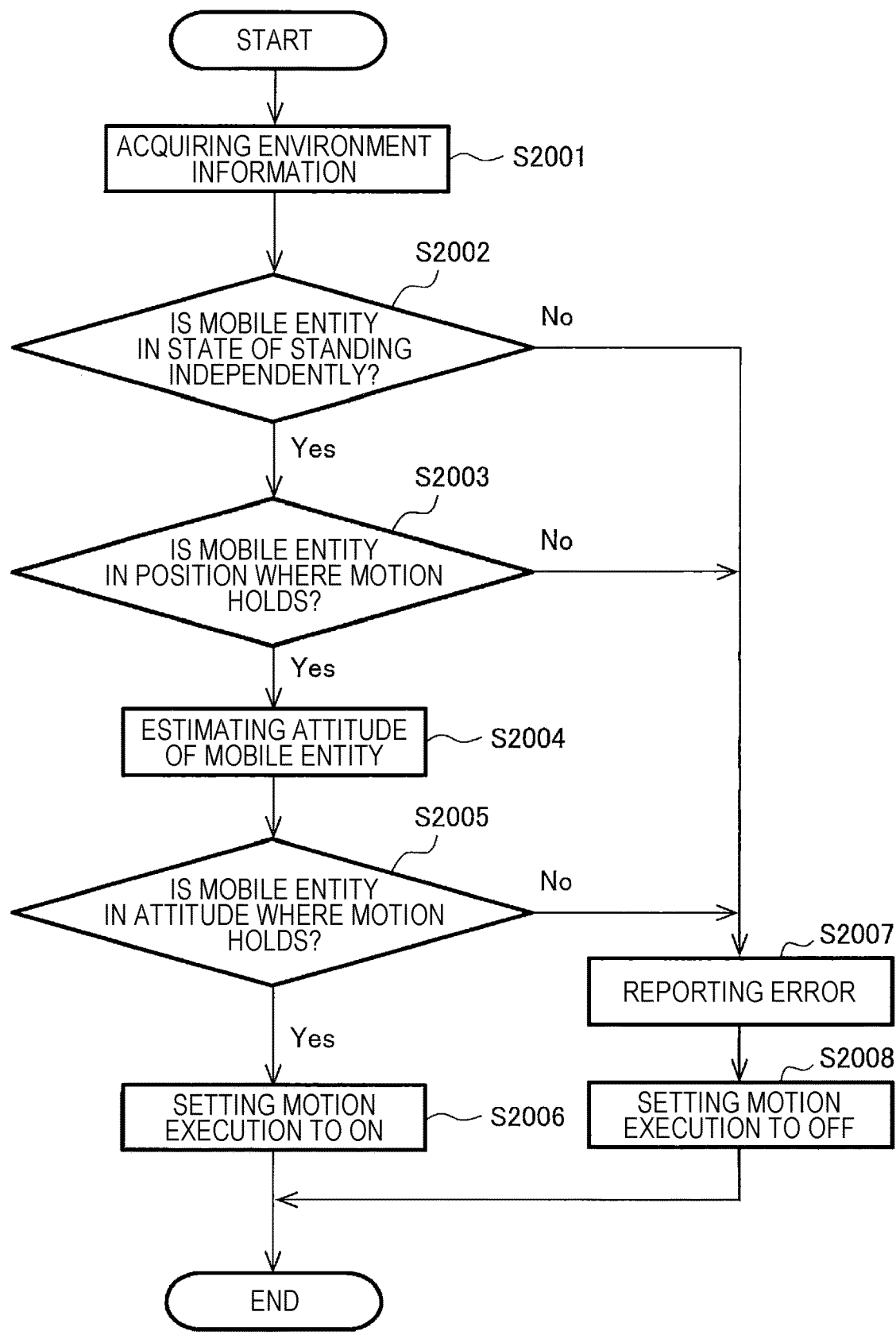
FIG. 9 is a flowchart illustrating an example of processing of a motion determination unit according to the second embodiment.

FIG. 9 is a flowchart illustrating an example of processing of the motion determination unit 15 according to the present embodiment. Here, a case where the motion determination unit 15 performs each process with reference to the environment information related to the attitude angle detecting device 50 will be described as an example. It should be noted that, in FIG. 9, a duplicate description will be omitted on the part common to that in FIG. 8.

The processes from step S2001 to step S2002 are the same as the processes from step S201 to step S202 in FIG. 8.

In step S2003, the motion determination unit 15 determines whether the position where the mobile entity 1 is present is a position where the motion requested by the task (motion scheduled to be performed) holds. If determining that the position where the mobile entity 1 is present is a position where the motion requested by the task holds, the motion determination unit 15 proceeds to the process in step S2004. If determining that the position where the mobile entity 1 is present is a position where the motion requested by the task does not hold, the motion determination unit 15 proceeds to the process in step S2007. It should be noted that the motion determination unit 15 may make the determination in consideration of the attitude of the mobile entity 1.

In step S2004, the motion determination unit 15 estimates the attitude of the mobile entity 1. The motion determination unit 15 determines whether the mobile entity 1 normally stands upright based on whether the attitude angle detected by the attitude angle detecting device 50 satisfies a predetermined range, and estimates the attitude of the mobile entity 1.

Figure 10:
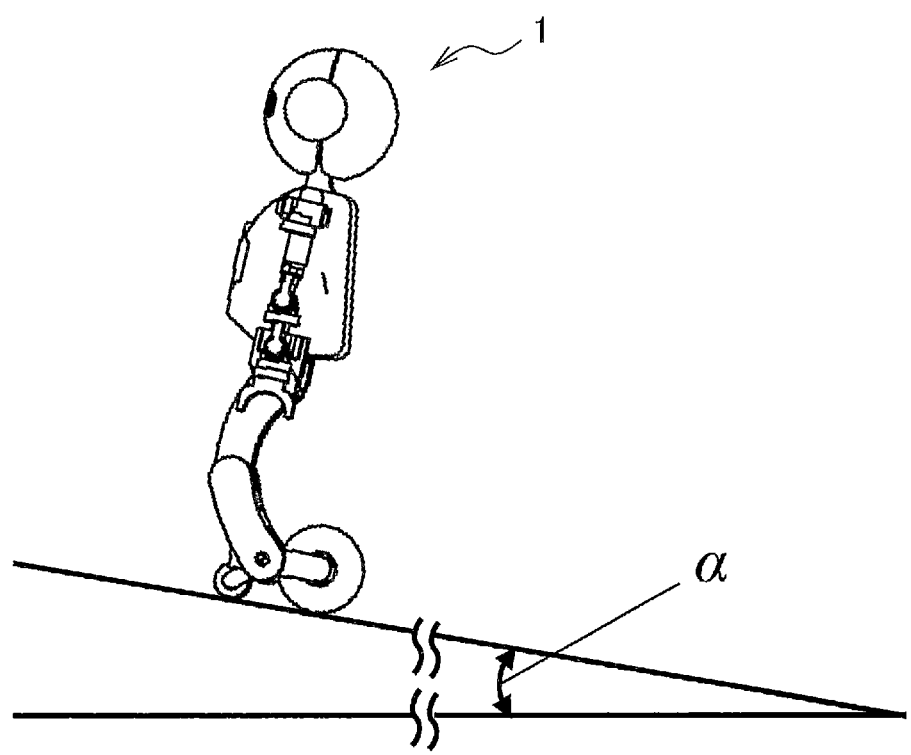
FIG. 10 is an external view of a mobile entity standing upright on a floor surface having an inclination angle α.

As shown in FIG. 10, when the mobile entity 1 stands upright on the floor surface having the inclination angle $\alpha$, for example, the mobile entity 1 is inclined backward by the amount of the inclination angle $\alpha$ of the floor surface, so that the ideal value of the attitude angle $\theta$ related to the pitch direction is the angle $-\alpha$. It should be noted that the forward inclination of the mobile entity 1 is assumed to be a positive (+) angle, and the backward inclination of the mobile entity 1 is assumed to be a negative (−) angle.

In addition, the attitude angle $\theta$ detected by the attitude angle detecting device 50 actually includes a detection error $\theta f$ and constantly fluctuates. Therefore, in consideration of the detection error $\theta f$, the motion determination unit 15 can determine whether the mobile entity 1 stands upright normally based on whether the attitude angle $\theta$ detected by the attitude angle detecting device 50 satisfies $-\alpha-\theta f \leq \theta \leq -\alpha+\theta f$.

If the attitude angle $\theta$ satisfies $-\alpha-\theta f \leq \theta \leq -\alpha+\theta f$, the motion determination unit 15 determines that the mobile entity 1 stands upright normally on the floor surface having the inclination angle $\alpha$, and estimates that the attitude of the mobile entity 1 is an upright attitude. On the other hand, if the attitude angle $\theta$ does not satisfy $-\alpha-\theta f \leq \theta \leq -\alpha+\theta f$, the motion determination unit 15 determines that the mobile entity 1 does not stand upright normally on the floor surface having the inclination angle $\alpha$, and estimates that the attitude of the mobile entity 1 is not an upright attitude.

In step S2005, the motion determination unit 15 determines whether the attitude of the mobile entity 1 is an attitude where the motion requested by the task (motion scheduled to be performed) holds.

If determining that the attitude of the mobile entity 1 is an attitude where the motion requested by the task holds (normal attitude), the motion determination unit 15 proceeds to the process in step S2006. If determining that the attitude of the mobile entity 1 is an attitude where the motion requested by the task does not hold (abnormal attitude), the motion determination unit 15 proceeds to the process in step S2007.

In step S2006, the motion determination unit 15 sets the motion execution to ON.

In step S2007, if a transition is made from step S2002, the motion determination unit 15 sets an error expressing that since the mobile entity 1 does not stand independently, the mobile entity 1 will break down when performing the motion scheduled to be performed. Then, the motion determination unit 15 reports an error to the administrator or the operator of the mobile entity 1.

In addition, in step S2007, if a transition is made from step S2003, the motion determination unit 15 sets an error expressing that since the distance to the nearby obstacle 32 or wall 33 is shorter than the shortest distance to the obstacle 32 or wall 33 where the motion scheduled to be performed holds, the motion scheduled to be performed does not hold. Then, the motion determination unit 15 reports an error to the administrator or the operator of the mobile entity 1.

In addition, in step S2007, if a transition is made from step S2005, the motion determination unit 15 sets an error expressing that since the attitude of the mobile entity 1 is an abnormal attitude, the motion scheduled to be performed does not hold. Then, the motion determination unit 15 reports an error to the administrator or the operator of the mobile entity 1.

The process in step S2008 is the same as the process in step S206 in FIG. 8.

According to the above-described processing, it is possible for the mobile entity 1 to determine in advance whether a motion scheduled to be performed holds in an environment where the mobile entity 1 is present. Thus, it is possible to prevent the mobile entity 1 from colliding with a wall or an obstacle or falling over during motion.

Third Embodiment

«Returning of Mobile Entity from Fallen State»

In the present embodiment, a case will be described where the mobile entity 1 performs returning from a fallen state as a motion scheduled to be performed. FIG. 11 is a schematic diagram illustrating an example of returning from a fallen state being one of the motions scheduled to be performed by the mobile entity 1 according to the present embodiment.

Figure 11A:
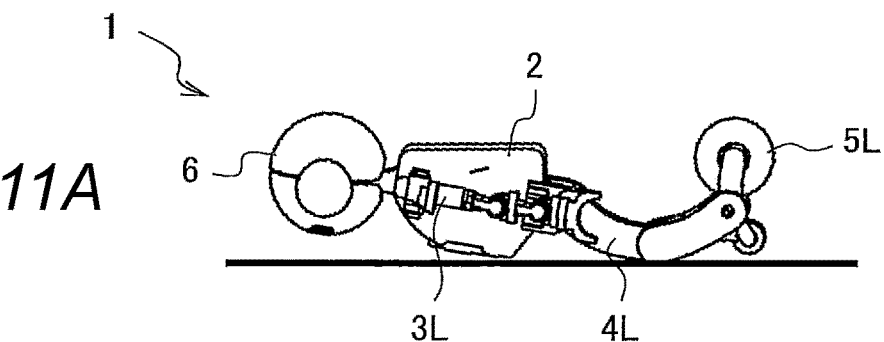
FIG. 11A is a schematic diagram illustrating an example of returning from a fallen state of the mobile entity according to the present embodiment.
Figure 11B:
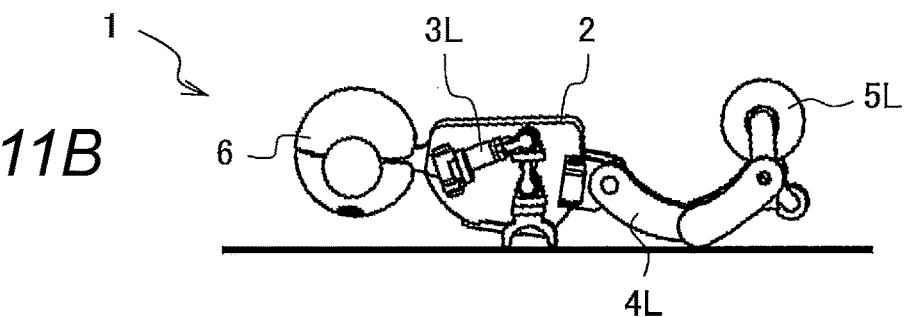
FIG. 11B is a schematic diagram illustrating an example of returning from a fallen state of the mobile entity according to the present embodiment.
Figure 11C:
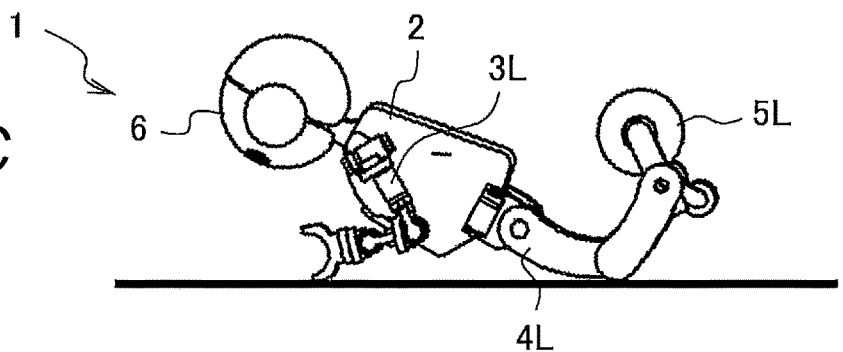
FIG. 11C is a schematic diagram illustrating an example of returning from a fallen state of the mobile entity according to the present embodiment.
Figure 11D:
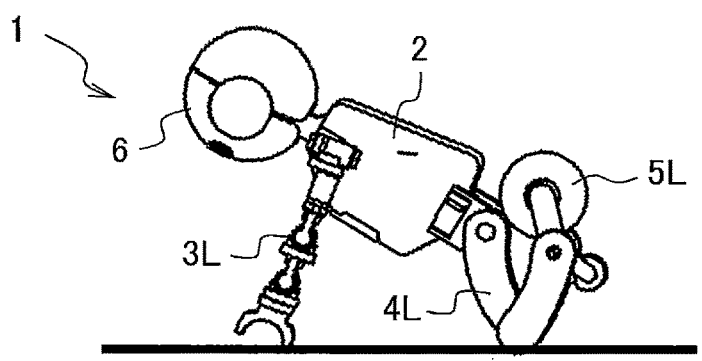
FIG. 11D is a schematic diagram illustrating an example of returning from a fallen state of the mobile entity according to the present embodiment.
Figure 11E:
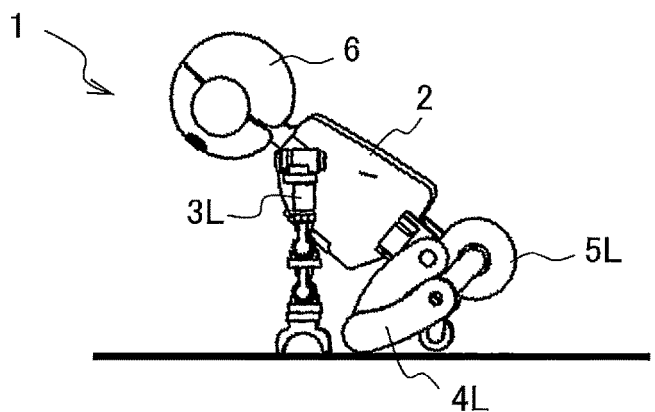
FIG. 11E is a schematic diagram illustrating an example of returning from a fallen state of the mobile entity according to the present embodiment.
Figure 11F:
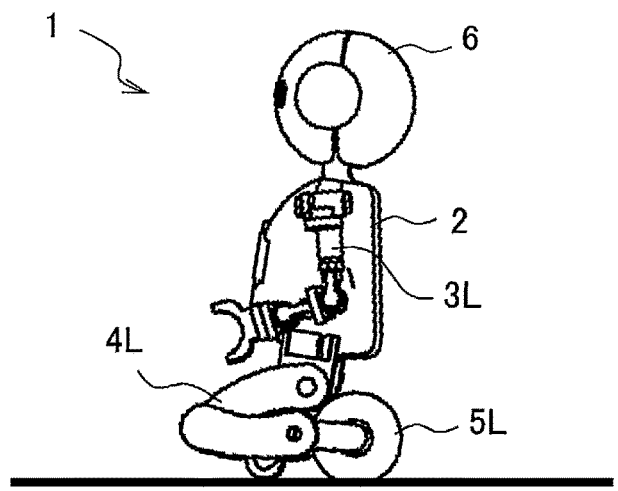
FIG. 11F is a schematic diagram illustrating an example of returning from a fallen state of the mobile entity according to the present embodiment.
Figure 11G:
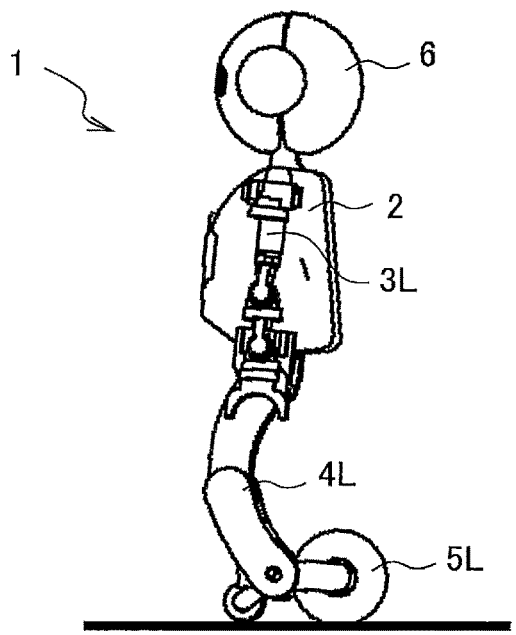
FIG. 11G is a schematic diagram illustrating an example of returning from a fallen state of the mobile entity according to the present embodiment.

In FIG. 11A, the mobile entity 1 has fallen over and is in a face-down state. In FIG. 11B, the mobile entity 1 bends the body 2 backward, bends the arms 3L and 3R, and bends the legs 4L and 4R. In FIG. 11C, the mobile entity 1 moves the arms 3L and 3R toward the head 6 and further bends the legs 4L and 4R. In FIG. 11D, the mobile entity 1 extends the arms 3L and 3R and further bends the legs 4L and 4R. In FIG. 11E, the mobile entity 1 moves toward the legs 4L and 4R by extending the arms 3L and 3R while tilting the body 2 forward. In FIG. 11F, the mobile entity 1 bends the body 2 backward, moves backward while bending the arms 3L and 3R, and enters a sitting state. In FIG. 11G, the mobile entity 1 is in an upright state with the arms 3L and 3R extended and the legs 4L and 4R extended.

Returning from a fallen state may be a motion where the mobile entity 1 returns from a state of having fallen over with its face down as shown in FIG. 11A to a state of sitting as shown in FIG. 11F, or may be a motion where the mobile entity 1 returns from a state of having fallen over with its face down as shown in FIG. 11A to a state of standing upright as shown in FIG. 11G.

It should be noted that as shown in FIG. 11F, the mobile entity 1 can travel with the wheels 5L and 5R even in a sitting state. Therefore, the mobile entity 1 may move in a state of sitting with a low center of gravity in places where the inclination angle of the floor surface is steep, may move to a suitable place for standing up, and then may be in an upright state as shown in FIG. 11G.

The mobile entity 1 controlled by the above-described motion control system 100 can determine in advance whether the motion scheduled to be performed holds in consideration of the surrounding environment. Therefore, for example, even when falling over, the mobile entity 1 can appropriately return from a fallen state.

«Example of Processing of Motion Determination Unit»

Figure 12:
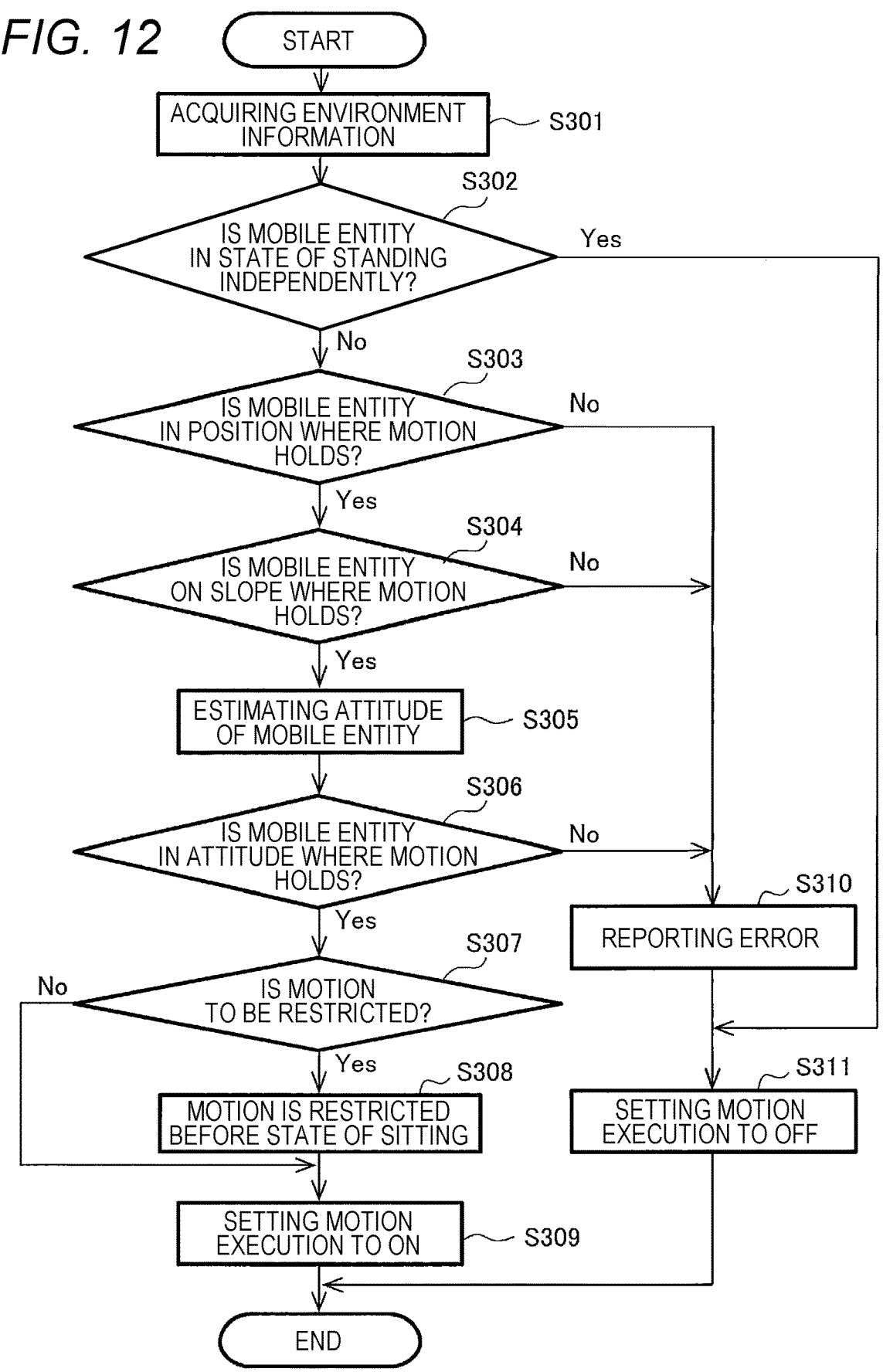
FIG. 12 is a flowchart illustrating an example of processing of a motion determination unit according to a third embodiment.

FIG. 12 is a flowchart illustrating an example of processing of the motion determination unit 15 according to the present embodiment. Here, a case will be described as an example where the mobile entity 1 returns from a state of having fallen over and being with its face down, but the same processing can be performed also in cases where the mobile entity 1 returns from a state of having fallen over and being with its face up and where the mobile entity 1 returns from a state of having fallen over and being with its face sideways (left, right).

The processes from step S301 to step S303 are the same as the processes from step S2001 to step S2003 in FIG. 9.

In step S304, the motion determination unit 15 determines whether the inclination angle of the floor surface on which the mobile entity 1 is present is an inclination angle at which returning from a fallen state (motion scheduled to be performed) holds. If determining that the inclination angle of the floor surface on which the mobile entity 1 is present is an inclination angle at which returning from a fallen state holds, the motion determination unit 15 proceeds to the process in step S305. If determining that the inclination angle of the floor surface on which the mobile entity 1 is present is not an inclination angle at which returning from a fallen state holds, the motion determination unit 15 proceeds to the process in step S310.

That is, if the inclination of the floor surface is flat or gentle, the mobile entity 1 does not fall over again when standing up, so that returning from a fallen state holds. On the other hand, if the inclination of the floor surface is steep, the mobile entity 1 falls over again when standing up, so that returning from a fallen state does not hold.

For example, it is assumed that the "inclination angle of the floor surface" is $\alpha$. At this time, the motion determination unit 15 determines whether the inclination angle $\alpha$ of the floor surface is not more than the inclination angle $\alpha 2$ at which returning from a fallen state holds (inclination angle $\alpha \leq$ inclination angle $\alpha 2$).

Therefore, if the inclination angle $\alpha$ of the floor surface is not larger than the inclination angle $\alpha 2$, the motion determination unit 15 determines that the inclination angle $\alpha$ of the floor surface is an angle at which returning from a fallen state holds, and proceeds to the process in step S305. On the other hand, if the inclination angle $\alpha$ of the floor surface is larger than the inclination angle $\alpha 2$, the motion determination unit 15 determines that the inclination angle $\alpha$ of the floor surface is not an angle at which returning from a fallen state holds, and proceeds to the process in step S310.

In step S305, the motion determination unit 15 estimates the attitude of the mobile entity 1. The motion determination unit 15 determines whether the mobile entity 1 falls over normally based on whether the attitude angle detected by the attitude angle detecting device 50 satisfies a predetermined range, and estimates the attitude of the mobile entity 1. It should be noted that the "attitude where the mobile entity 1 has fallen over normally" refers to a fallen attitude where returning from a fallen state shown in FIG. 11 can hold, and the "attitude where the mobile entity 1 has not fallen over normally" refers to a fallen attitude where returning from a fallen state shown in FIG. 11 cannot hold.

Figure 13:
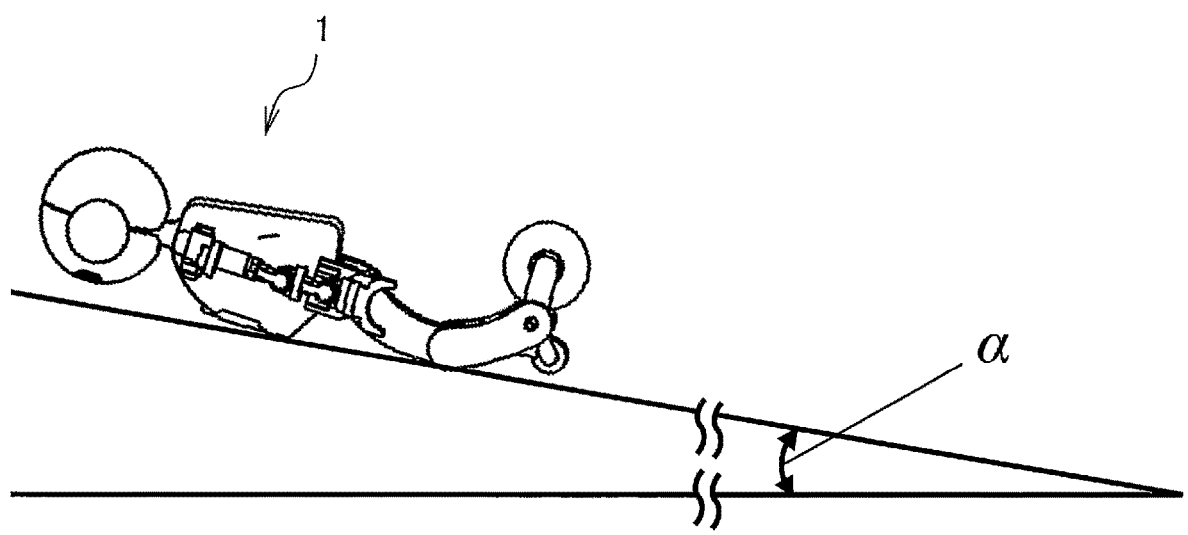
FIG. 13 is an external view of a mobile entity fallen over with its face down on a floor surface having an inclination angle α.

As shown in FIG. 13, if the mobile entity 1 falls over on the floor surface having the inclination angle $\alpha$ in a state of its face down, for example, the mobile entity 1 is in a state of getting up by the amount of the inclination angle $\alpha$ of the floor surface, so that the ideal value of the attitude angle $\theta$ related to the pitch direction is the angle $\pi/2-\alpha$. It should be noted that the forward inclination of the mobile entity 1 is assumed to be a positive (+) angle, and the backward inclination of the mobile entity 1 is assumed to be a negative (−) angle.

In addition, the attitude angle $\theta$ detected by the attitude angle detecting device 50 actually includes a detection error $\theta c$ and constantly fluctuates. Therefore, in consideration of the detection error $\theta c$, the motion determination unit 15 can determine whether the mobile entity 1 has fallen over normally based on whether the attitude angle $\theta$ detected by the attitude angle detecting device 50 satisfies $\pi/2-\alpha-\theta c \leq \theta \leq \pi/2-\alpha+\theta c$.

If the attitude angle $\theta$ satisfies $\pi/2-\alpha-\theta c \leq \theta \leq \pi/2-\alpha+\theta c$, the motion determination unit 15 determines that the mobile entity 1 has fallen over normally on the floor surface having the inclination angle $\alpha$, and estimates that the attitude of the mobile entity 1 is a normal fallen attitude (not falling over while leaning against an obstacle or the like). On the other hand, if the attitude angle $\theta$ does not satisfy $\pi/2-\alpha-\theta c \leq \theta \leq \pi/2-\alpha+\theta c$, the motion determination unit 15 determines that the mobile entity 1 has not fallen over normally on the floor surface having the inclination angle $\alpha$, and estimates that the attitude of the mobile entity 1 is an abnormal fallen attitude (falling over while leaning against an obstacle or the like).

In step S306, the motion determination unit 15 determines whether the attitude of the mobile entity 1 is an attitude where returning from a fallen state holds.

If determining that the attitude of the mobile entity 1 is an attitude where returning from a fallen state holds (normal fallen attitude), the motion determination unit 15 proceeds to the process in step S307. If determining that the attitude of the mobile entity 1 is an attitude where returning from a fallen state does not hold (abnormal fallen attitude), the motion determination unit 15 proceeds to the process in step S310.

In step S307, the motion determination unit 15 determines whether to restrict a motion scheduled to be performed (returning from a fallen state). If determining that returning from a fallen state is not to be performed to the end, that is, that the motion scheduled to be performed is to be restricted, the motion determination unit 15 proceeds to the process in step S308. On the other hand, if determining that returning from a fallen state is to be performed to the end, that is, that the motion scheduled to be performed is not to be restricted, the motion determination unit 15 proceeds to the process in step S309.

For example, it is assumed that the "inclination angle of the floor surface" is $\alpha$. At this time, the motion determination unit 15 determines whether the inclination angle $\alpha$ of the floor surface is not larger than the inclination angle of the floor surface $\alpha 2$ ($>\alpha 1$) at which, as shown in FIG. 11F, the mobile entity 1 can return from a state of having fallen over with its face down to a state of sitting, and whether the inclination angle $\alpha$ of the floor surface is larger than the inclination angle of the floor surface $\alpha 1$ at which, as shown in FIG. 11G, the mobile entity 1 can return from a state of having fallen over with its face down to a state of standing upright.

Therefore, if the inclination angle $\alpha$ of the floor surface satisfies $\alpha 1 < \alpha \leq \alpha 2$, the motion determination unit 15 restricts returning from a fallen state, that is, determines that the motion of the mobile entity 1 should be interrupted from a state of having fallen over with its face down to a state of sitting, and proceeds to the process in step S308. On the other hand, if the inclination angle $\alpha$ of the floor surface satisfies $\alpha \leq \alpha 1$, the motion determination unit 15 does not restrict returning from a fallen state, that is, determines that the motion of the mobile entity 1 should be continued from a state of having fallen over with its face down to a state of standing upright, and proceeds to the process in step S309.

In step S308, the motion determination unit 15 aborts the motion in a state where the mobile entity 1 sits (see FIG. 11F).

The process in step S309 is the same as the process in step S2006 in FIG. 9.

In step S310, if a transition is made from step S303, the motion determination unit 15 sets an error expressing that since the position where the mobile entity 1 is present is a position where the motion scheduled to be performed is obstructed by the nearby obstacle 32 or wall 33, returning from a fallen state does not hold. Then, the motion determination unit 15 reports an error to the administrator or the operator of the mobile entity 1.

In addition, if a transition is made from step S304, the motion determination unit 15 sets an error expressing that since the inclination angle of the floor surface on which the mobile entity 1 is present is not an inclination angle at which the mobile entity 1 can return from a fallen state, returning from a fallen state does not hold. Then, the motion determination unit 15 reports an error to the administrator or the operator of the mobile entity 1.

In addition, if a transition is made from step S306, the motion determination unit 15 sets an error expressing that since the attitude of the mobile entity 1 is an abnormal fallen attitude, returning from a fallen state does not hold. Then, the motion determination unit 15 reports an error to the administrator or the operator of the mobile entity 1.

The process in step S311 is the same as the process in step S2008 in FIG. 9.

It should be noted that the processing of the third embodiment can be combined with the processing of the second embodiment. For example, in step S202 illustrated in FIG. 8 and step S2002 illustrated in FIG. 9, if determining that the mobile entity 1 does not stand independently, the motion determination unit 15 can transition to the process in step S303 illustrated in FIG. 12.

According to the above-described processing, it is possible for the mobile entity 1 to determine in advance whether a motion scheduled to be performed holds in an environment where the mobile entity 1 is present. Thus, since it is possible to prevent execution of unreasonable returning from a fallen state, it is possible to prevent a failure of the mobile entity 1.

REFERENCE SIGNS LIST 1 mobile entity
13 self-position estimation unit (position decision unit)
14 environment information acquisition unit
15 motion determination unit
16 motion executing unit (motion command unit)
20 vocal apparatus
30 display device
32 obstacle
33 wall
50 attitude angle detecting device
80 environment information setting device
100 motion control system
$\alpha$ attitude angle

The invention claimed is:
1. A mobile entity comprising;
an attitude angle detecting device configured to detect an attitude angle of a mobile entity;
a processor which, when executing a program, configures the processor to:
determine a position of the mobile entity;
acquire environment information at the position, the environment information including an inclination angle of a floor surface; and
estimate a state that the mobile entity stands upright or falls down, based on the detected attitude angle of the mobile entity and the acquired inclination angle of the floor surface as the environment information and determine whether a motion where the mobile entity returns from a state of having fallen over is to be used if an attitude angle $\theta$ of the mobile entity satisfies $\pi/2-\alpha-\theta c \leq \theta \leq \pi/2-\alpha+\theta c$, wherein $\alpha$ is the inclination angle of the floor surface and $\theta c$ indicates a detection error.

2. The mobile entity according to claim 1, wherein the environment information includes at least one of environment information related to a vocal apparatus and environment information related to a display device.

3. The mobile entity according to claim 2, wherein the processor is further configured to, upon determining that the motion where the mobile entity returns from the state of having fallen over is not to be used, correct motion information related to the motion scheduled to be performed.

4. The mobile entity according to claim 3,
wherein the processor is further configured to:
estimate an attitude of the mobile entity based on the environment information and the attitude angle, and
determine whether the motion where the mobile entity returns from the state of having fallen over is to be used based on an estimated attitude.

5. The mobile entity according to claim 4, wherein the environment information includes at least one of the inclination angle of the floor surface, a distance to an obstacle or a wall, sound volume, and brightness.

6. The mobile entity according to claim 5, further comprising an environment information setting device configured to set, change, or update the environment information.

* * * * *